J. A. CAMPBELL.
MEANS FOR PROTECTING FREIGHT CARS AND THE LIKE FROM ENTRY.
APPLICATION FILED AUG. 2, 1909.
975,508.
Patented Nov. 15, 1910.
2 SHEETS—SHEET 2.
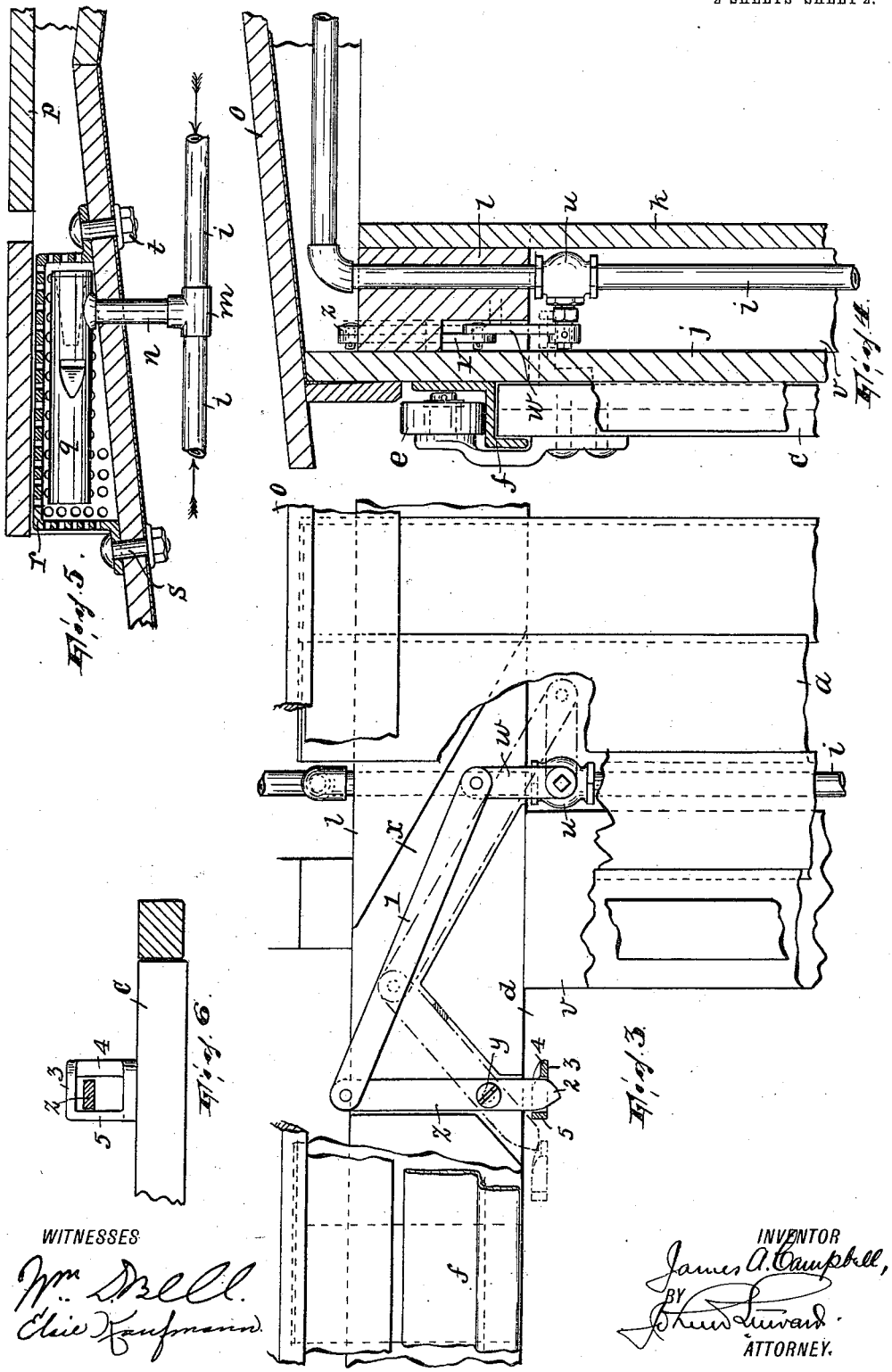

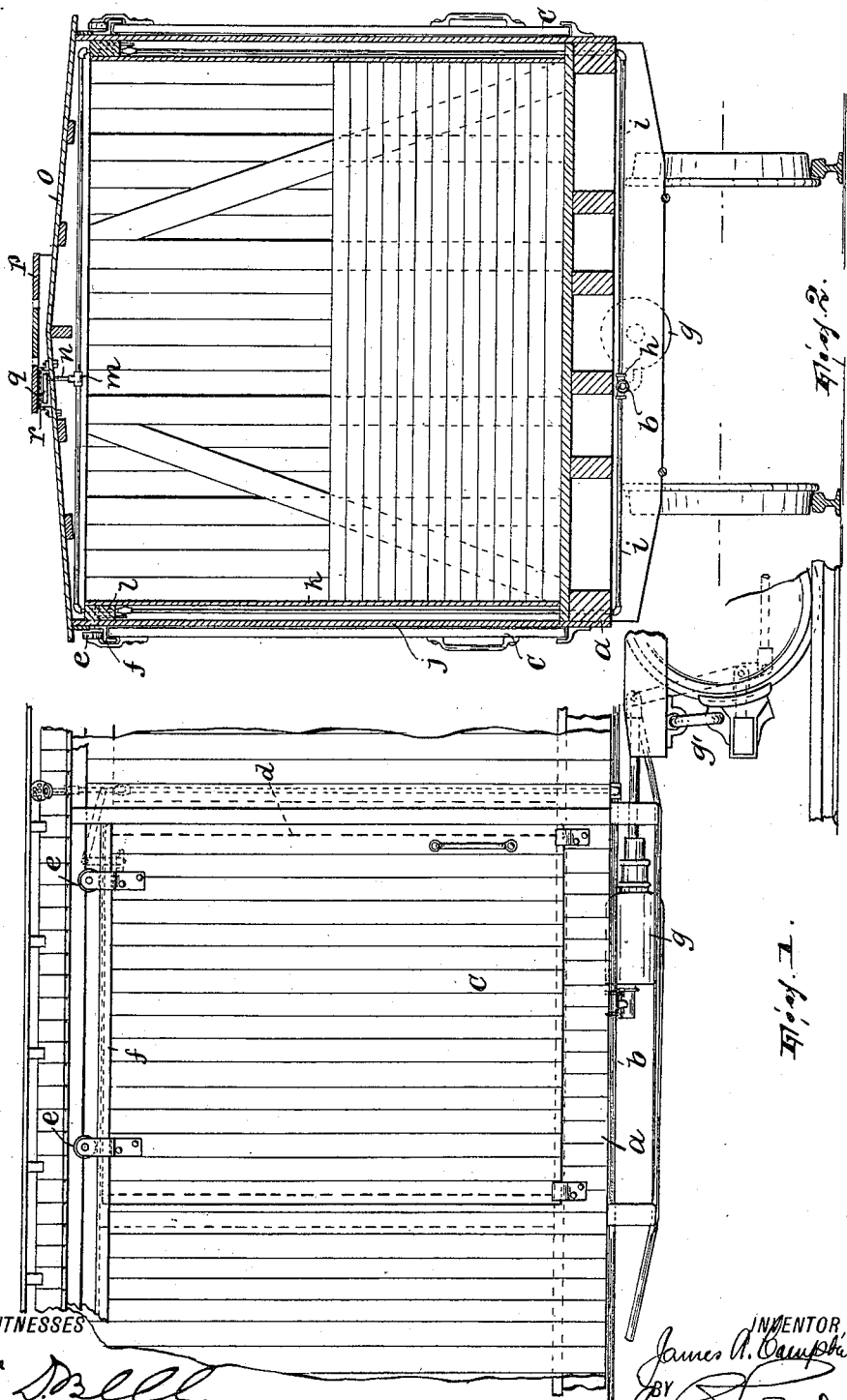

UNITED STATES PATENT OFFICE.

JAMES A. CAMPBELL, OF PATERSON, NEW JERSEY.

MEANS FOR PROTECTING FREIGHT-CARS AND THE LIKE FROM ENTRY.

975,508.           Specification of Letters Patent.      Patented Nov. 15, 1910.

Application filed August 2, 1909. Serial No. 510,767.

*To all whom it may concern:*

Be it known that I, JAMES A. CAMPBELL, a citizen of the United States, residing in Paterson, Passaic county, New Jersey, have invented a certain new and useful Improvement in Means for Protecting Freight-Cars and the Like from Entry; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to means for protecting the contents of freight cars, express cars and the like while in transit against entry by thieves.

Railway companies provide guards at terminal yards to protect the cars so long as they are in the yards, but, during temporary stops while in transit, opportunity affords for the seals or locks of the car-doors to be broken and the cars burglarized. In this manner many thousands of dollars are lost yearly, heretofore without any practical way of preventing it.

My object is to provide means whereby the contents of a car will be safe against thieves while in transit, and in carrying my invention into practice I provide the part of the air-brake system applied to the car with a port affording communication with the atmosphere and also with a valve controlled by the car door or the like and controlling said port. When the door is closed the valve is closed; but once the car is then established as a part of a train under brake control from the engine, if the door should be opened, the valve (which is coupled with the door to partake of its movement in either direction when the door approximates the closing position) will be opened, producing the application of the brakes (which would of itself necessitate an inspection of the train) and, according to the preferred arrangement, sounding an alarm appropriated to the car tampered with.

I have fully illustrated my invention in the accompanying drawings, in which,

Figure 1 is a side view of a portion of a car having my invention applied thereto; Fig. 2 is a vertical transverse sectional view of what is shown in Fig. 1, the plane of the section being at the right in Fig. 1 of certain pipes; Fig. 3 is a view on a larger scale of the outside of the car at the upper right-hand corner of its door-opening, the structure of the car being broken away to reveal certain parts of the invention, which parts appear partly in side elevation and partly in section; Fig. 4 shows said parts of the invention in end elevation, partly in section, the car-structure itself appearing in transverse section; Fig. 5 illustrates the alarm device; and, Fig. 6 is a detail of what appears in Figs. 3 and 4.

The car $a$ has the usual section of pipe $b$ which may be coupled with similar sections on other cars to form the main line of pipe of the air-brake system of a train. The car also has the usual doors $c$ for closing the openings $d$ affording access to the inside of the car and arranged one at each side thereof in the usual manner; such doors in the accompanying drawings are shown as of the sliding type, carrying rollers $e$ which run on the rails $f$. I desire it to be understood, however, that my invention is not limited to its application to use in connection with a door, nor to a closing member of the sliding kind only.

$g$ is the auxiliary reservoir of the car, or other pressure source, communicating with pipe $b$, and $g'$ the brake mechanism operated in the present instance by pressure within the air brake system.

To pipe $b$, by means of the T $h$, are connected the branch pipes $i$, each extending first transversely under the car and then upwardly between the outer wall $j$ thereof and the lining $k$, penetrating the horizontal beam $l$ which runs along the car near the roof thereof; the ends of the pipes $i$ are then passed transversely under the roof of the car, fitting in a T $m$, from which projects upwardly a short section of pipe $n$ which penetrates the roof $o$ of the car under the running board $p$ and carries at its protruding end or outlet port a whistle or other alarm device $q$. This alarm device is preferably protected by a perforate shield $r$ which is secured to the roof $o$ by the bolts $s$ having their nuts $t$ on the inside of the car. The specific arrangement of the alarm device and the shield therefor has for its purpose to render it as completely inaccessible as possible, so that it may not be easily put out of order by unauthorized persons.

The way through each branch pipe $i$ is controlled by a valve $u$, the same being preferably disposed close into the angle between the beam $l$ and the studding $v$ which forms the jamb for the door $c$. The stem of this valve carries a crank $w$ which is movable from the horizontal position (representing the closed position of the valve) to the upright position (representing the open position of the valve), said crank in the latter case being received by a recess $x$ cut in the beam $l$. In said recess, on a screw $y$, is fulcrumed a lever $z$ which is connected to the crank $w$ by a link 1. The recess $x$ may be formed so as to limit the movement of the lever $z$ to an extent corresponding to the limits of movement of crank $w$ from the closed to the open position of the valve. The free end of the lever protrudes downwardly from the beam $l$ into the opening $d$ affording access to the interior of the car, and it is tapered, as at 2.

On the car door, projecting inwardly, is secured a loop 3, the side 4 of which adjoining the studding $v$ is lower than the opposite side 5. This loop is arranged at such a level that when the door is being closed, the lever $z$ being in the dotted line position in Fig. 3, its side 4 will pass under the point 2 of the lever, while its side 5 will engage the lever-point and turn the lever into the full line position, causing the point of the lever to enter between the parts 4 and 5 of the loop. When the door is opened the side 4 of the loop will push the point of the lever to the left in Fig. 3, the lever finally clearing the loop and being left in the dotted line position.

Operation: Assuming that each door of the car is closed and sealed or locked and that the car is then established as a part of a train and its pipe $b$ coupled with the air-brake system of the train; the valves $u$ at this time prevent flow of air through the hollow structure comprising the branch pipes $i$, T $m$ and pipe $n$ from the means for maintaining pressure in the hollow structure (pipe $b$) to the outlet port at the whistle. If either door $c$ is now opened, the resulting actuation of lever $z$ will move valve $u$ to the open position, permitting flow of air through the branch pipe $i$ of the hollow structure which contains the valve thus moved. The result will be the immediate application of the brakes and the simultaneous sounding of the whistle $q$. The train crew will thus be led to inspect the train and their attention drawn to the particular car tampered with by the sounding of its whistle.

It will be obvious that my invention is not limited to the protection of cars; it may be applied, for instance, to stationary compartments, such as store-rooms, and the like.

Having thus fully described my invention, what I claim as new and desire to secure by Letters Patent is:

1. The combination of a compartment having an opening affording access thereto, a member movable to obstruct and expose said opening, a hollow structure having a port affording communication between the interior of said structure and the atmosphere, an alarm device located at said port, means for maintaining a pressure within different from that outside of said structure, a valve arranged in said structure between said port and said means and movable to permit or prevent flow through said structure, and means for coupling said member and valve together for simultaneous movement when said member approximates the obstructing position, whereby movement of said member in either direction will be imparted to the valve, substantially as described.

2. The combination of a compartment having an opening affording access thereto, a member movable to obstruct and expose said opening, a hollow structure having a port affording communication between the interior of said structure and the atmosphere, an alarm device located at said port, means for maintaining a pressure within different from that outside of said structure, a valve arranged in said structure between said port and said means and movable to permit or prevent flow through said structure, a loop arranged horizontally on said member and having the side thereof which corresponds to the direction from which said member moves when opening higher than the opposite side thereof, a lever having one end movable into the path of movement of the high side of said loop, and means for connecting the lever and the valve, substantially as described.

3. The combination of a car having a running board on the top thereof, an alarm device located under said running board, a shield secured to the car and inclosing the alarm device, a member movable to obstruct and expose an opening in the car, a hollow structure having a port affording communication with the alarm device, means for maintaining a pressure within different from that outside of said structure, and a valve controlled by said member and arranged in said structure between said port and said means and movable to permit or prevent flow through said structure, substantially as described.

In testimony, that I claim the foregoing I have hereunto set my hand this 31st day of July, 1909.

JAMES A. CAMPBELL.

Witnesses:
JOHN W. STEWARD,
WM. D. BELL.